United States Patent
Cueto et al.

(10) Patent No.: US 11,234,295 B2
(45) Date of Patent: Jan. 25, 2022

(54) WIRELESS NETWORK DEVICE CONFIGURED FOR ADJUSTABLE POSITIONING

(71) Applicant: Comcast Cable Communications, LLC, Philadelphia, PA (US)

(72) Inventors: Osman Cueto, Lansdale, PA (US); Sean McGinnis, Philadelphia, PA (US); Michael Jou, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/595,072

(22) Filed: Oct. 7, 2019

(65) Prior Publication Data

US 2021/0105868 A1    Apr. 8, 2021

(51) Int. Cl.
*H04W 88/16* (2009.01)
*H01Q 3/08* (2006.01)

(52) U.S. Cl.
CPC ............. *H04W 88/16* (2013.01); *H01Q 3/08* (2013.01)

(58) Field of Classification Search
CPC .................................................. H04W 88/16
See application file for complete search history.

(56) References Cited

U.S. PATENT DOCUMENTS

| | | | |
|---|---|---|---|
| 2010/0177750 A1* | 7/2010 | Essinger | H04L 67/12 370/338 |
| 2014/0029215 A1* | 1/2014 | Cariou | H05K 3/30 361/752 |
| 2015/0181323 A1* | 6/2015 | Raklev | H04R 1/10 381/370 |
| 2019/0116652 A1* | 4/2019 | Oliver | H04L 12/2829 |
| 2019/0209022 A1* | 7/2019 | Sobol | A61B 5/7435 |

* cited by examiner

*Primary Examiner* — Fahmida S Chowdhury
(74) *Attorney, Agent, or Firm* — BakerHostetler

(57) ABSTRACT

Systems, methods, and devices relating to a wireless network device configured for adjustable positioning are described herein. In an example, a network device comprises a body and a bendable element configured to carry electrical power to the body and components therein. The body houses an antenna and transceiver configured for wireless communication. The bendable element, attached to the body of the network device, is configured for adjustable positioning such that a position of the bendable element is substantially maintained when the positioning force is removed. A facing of the antenna within the body may be based on the positioning of the bendable element.

20 Claims, 6 Drawing Sheets

WIRELESS NETWORK DEVICE CONFIGURED FOR ADJUSTABLE POSITIONING

BACKGROUND

Under an Internet of Things (IoT) or similar model, a wide variety of objects may be equipped with embedded electronics that enable these objects to collect and exchange data across a communication network. As an example, a home gas meter may be configured with electronics that collect and store the home's gas usage. The gas usage data may be periodically uploaded to the utility company's systems. An IoT (or similar) device may also find use in home automation. For example, a "smart" light fixture or even light bulb may be configured to turn on or off according to an external control signal received by the light fixture or bulb. The term "end node" may be used to refer to these embedded electronics, IoT devices, or the like.

In many cases, wireless communication is used to send data to and/or receive data from an end node. For example, end nodes often wirelessly communicate with a network device (e.g., a gateway) to effectuate communication with other upstream systems. Yet there are challenges in implementing wireless communication between an end node and an associated network device. For example, such wireless communication may be hampered by the distance between the end node and network device, intervening physical objects or structures that absorb the wireless signal, or electromagnetic interference. Further exacerbating these challenges is the fact that an end node is often unconnected to an external power source and must instead rely on its own battery power, which may be quite limited.

These and other shortcomings are addressed in the present disclosure.

SUMMARY

Systems, methods, and devices relating to a wireless network device configured for adjustable positioning are described herein. A network device may comprise a body and a bendable element configured to carry electrical power to the body and components therein. The body may house an antenna and transceiver configured for wireless communication. The bendable element, attached to the body of the network device, may be configured for adjustable positioning such that a position of the bendable element may be substantially maintained when the positioning force is removed.

A facing of the antenna within the body may be based on the positioning of the bendable element. The performance of the antenna in receiving and/or transmitting RF signals may be based on the positioning of the antenna.

The bendable element may comprise a plug configured to receive electrical power from a power source. The plug may be connected to a port of the power source. This connection may physically support, at least in part, the network device. The plug may comprise a USB plug and the port of the power source may comprise a USB port.

The bendable element may be configured to adjust the position of the body corresponding to a length-wise dimension of the body, a direction corresponding to a width-wise dimension of the body, and/or a direction corresponding to a height-wise dimension of the body. The bendable element may be additionally or alternatively configured to adjust the orientation of the body with respect to a length-wise axis of the body, a height-wise axis of the body, and/or a width-wise axis of the body.

The network device may be configured as an LPWAN gateway. The network device so-configured may communicate, via the antenna, with one or more end nodes of the LPWAN. The network device may be configured to communicate with the one or more end nodes via a low-power protocol, such as a protocol comprising at least one of Zigbee, Z-Wave, Wi-Fi HaLow, NB-IoT, DASH7, Sigfox, or LoRa.

A network device may comprise a body and a printed circuit board (PCB) housed within the body. The PCB may comprise an antenna configured to enable radio frequency (RF) communication. The network device may further comprise a bendable element comprising an elongate bendable section and a plug configured to receive electrical power. A proximate end of the bendable section may be attached to and physically support the body. A distal end of the bendable section may be configured with the plug. The bendable section may comprise a power transmission element that electrically connects the plug with a power unit associated with the PCB. The bendable section may comprise a malleable element via which a variable positioning of the bendable section is substantially maintained upon removal of a positioning force.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices.

Aspects of the disclosure will now be described in detail with reference to the drawings, wherein like reference numbers refer to like elements throughout, unless specified otherwise.

DETAILED DESCRIPTION

Systems, methods, and devices relating to a wireless network device configured for adjustable positioning are described.

Figure 1:
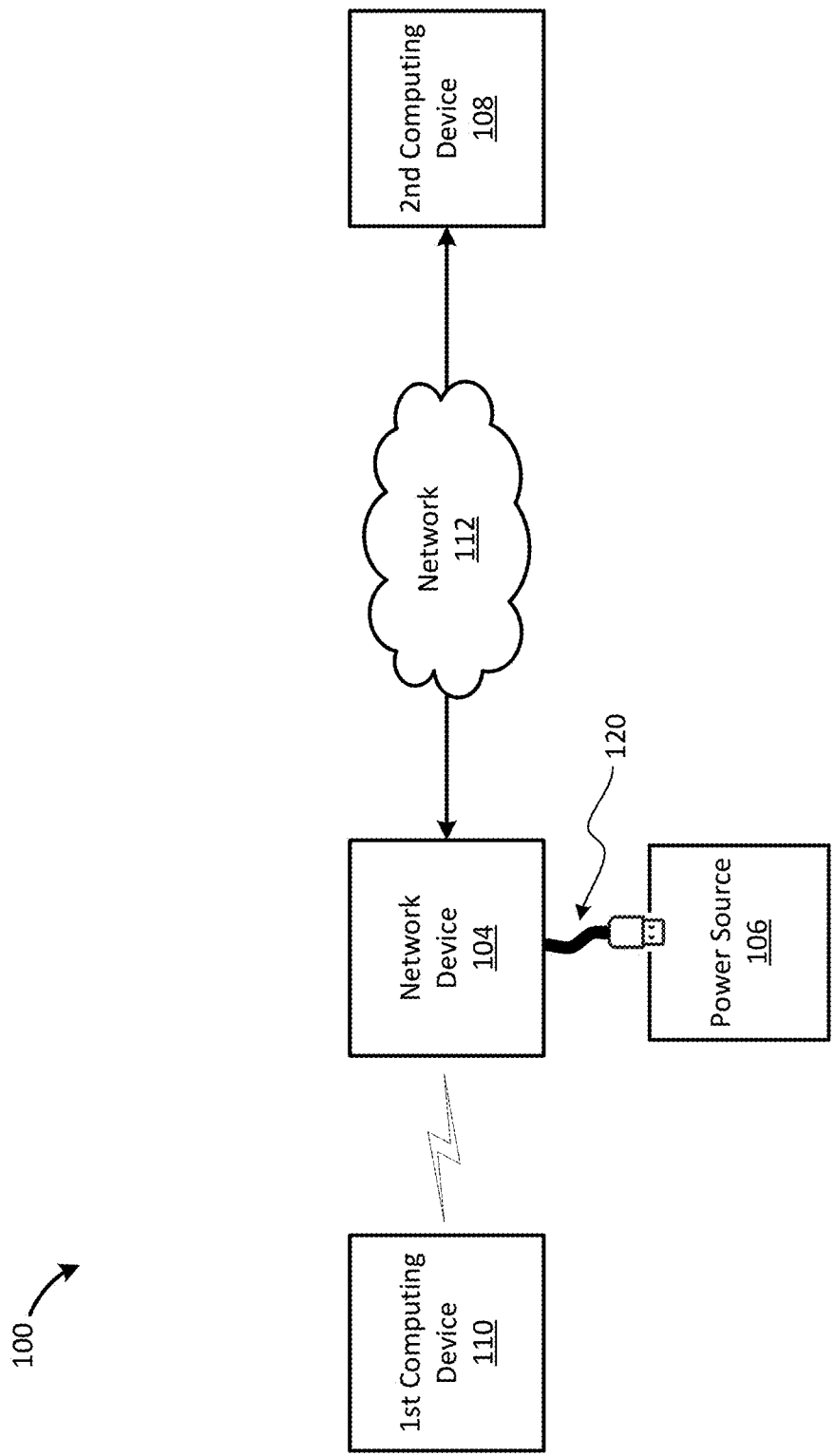
FIG. 1 illustrates a block diagram of a communication system.

FIG. 1 illustrates a system 100 in which the present systems, methods, and devices may be implemented. The system 100 comprises a first computing device 110 in communication with a second computing device 108 via a network 112 and a network device 104. The network device 104 may be configured for adjustable positioning to achieve favorable wireless signal reception and/or transmission. For example, the network device 104 may be configured with an antenna within the network device's 104 body. The facing of the antenna may be adjusted by bending and/or twisting the bendable element 120 to a desired position. Electrical power from a power source 106 may be provided to the network device 104 via the bendable element 120. The system 100 may be configured, at least in part, as a low power wide area network (LPWAN) but is not so limited. The network device 104, including the bendable element 120, may comprise a "dongle" device, such as a universal serial bus (USB) dongle device.

The network device 104 may be configured to effectuate communication between the first computing device 110 and the network 112, including the second computing device 108 and other computing devices connected to the network 112. Communication between the network device 104 and the first computing device 110 is generally contemplated to be wireless. The network device's 104 communications to the network 112 may be wired, wireless, or a combination thereof. The network device 104 may comprise a router or gateway configured to receive communication data from the first computing device 110 and transmit (e.g., route) the data to the network 112 and the second computing device 108. Conversely, the network device 104 may be configured to receive communication data from the network 112, such as that from the second computing device 108, and transmit (e.g., route) the data to the first computing device 110. The network device 104 may be additionally or alternatively realized as a residential gateway or router, such as a cable modem, DSL modem, wireless router, or wireless access point. The network device 104 may be realized as an LPWAN gateway configured to communicate with low-powered sensors, IoT devices, or embedded electronics (i.e., "end nodes"). The network device 104 configured as an LPWAN gateway may be located at a residence.

The first computing device 110 may be configured as an end node, such as an end node in an LPWAN. The first computing device 110 may be in the form of embedded electronics of another device or object. The first computing device 110 may operate using only battery power (e.g., the first computing device's 110 own battery power). The first computing device 110 may be configured generally to consume minimal power. The first computing device 110 may comprise a sensor configured to collect data, such as data associated with the first computing device's 110 surroundings. The first computing device 110 may comprise an actuator configured to effectuate an action or function (e.g., a pre-determined action or function) based on a received communication and/or collected data. The first computing device 110 may be configured to communicate data (e.g., the collected data) to the network device 104. For example, the first computing device 110 may communicate data (e.g., a message) based on data collected or measured by the first computing device 110.

The first computing device 110 may comprise a personal computer, a laptop computer, a tablet computer, a mobile device (e.g., a cell phone or smartphone), or other type of computing device. The first computing device 110 may be configured with an antenna and a receiver and/or a transmitter, which may be used to wirelessly communicate with the network device 104. The first computing device 110 may be configured for in-bound communication only, out-bound communication only, or bi-directional communication.

The network device 104 may be configured for wireless communication with the first computing device 110 via an antenna of the network device 104. The network device 104 and the first computing device 110 may form part of a wireless local area network (WLAN), a wide area network (WAN), or a wireless personal area network (WPAN). The network device 104 and the first computing device 110 additionally or alternatively may form part of an LPWAN. The network device 104 and the first computing device 11 may wirelessly communicate with one another according to one or more of a variety of specifications, standards, or protocols. For example, the network device 104 and the first computing device 110 may communication via Wi-Fi, such as according to one of the various IEEE 802.11 standards. The network device 104 and the first computing device 110 may communication via Bluetooth, Zigbee, Z-Wave, Wi-Fi HaLow, Narrowband IoT (NB-IoT), DASH7, or Sigfox. The network device 104 and the first computing device 110 may communicate via LoRa and/or LoRaWAN protocols. In a low power implementation, the network device 104 and the first computing device 110 may communicate with one another using, for example, one or more of the aforementioned Zigbee, Z-Wave, Wi-Fi HaLow, NB-IoT, DASH7, Sigfox, or LoRa protocols.

The network device 104 may communicate with the network 112 via wireless communication, wired communication, or a combination thereof. As examples of wired communications, the network device 104 may communication with the network 112 via ethernet, a cable internet connection, or a DSL connection. As examples of wireless communications, the network device 104 may communicate with the network 112 via Wi-Fi (or other wireless protocol described herein) or a cellular connection. The protocol and/or medium that the network device 104 uses to communicate with the first computing device 110 may be different than the protocol and/or medium used by the network device 104 to communicate with the network 112.

The network device 104 (e.g., configured as a gateway) may be configured to communicate with a second network device (e.g., a router, Wi-Fi router, wireless access point, cable modem, or DSL modem) over a wired or wireless connection. The second network device may be co-located with the network device 104, such as at a residence. The network device 104 may communicate with the first computing device 110 using a low-power first protocol (e.g., LoRa, Zigbee, Z-Wave, Wi-Fi HaLow, NB-IoT, DASH7, or Sigfox). The network device 104 may communicate with the second network device using a different, second protocol (e.g., ethernet or Wi-Fi). The second network device may route or otherwise transmit data received from the network device 104 to the network 112, such as via a cable internet connection, a DSL internet connection, or a cellular connection.

The network device 104 may be configured for cellular communication with a cellular network in the network 112. The network device 104 may communicate with the first computing device 110 using a low-power first protocol (e.g., LoRa, Zigbee, Z-Wave, Wi-Fi HaLow, NB-IoT, DASH7, or Sigfox). The network device 104 may communicate data received from the first computing device 110 to the network 112 via the network device's 104 cellular connection (e.g., via a cellular communication protocol) to the network 112.

The network device 104 may be configured with a bendable element 120 that is connected to the power source 106 supplying the network device 104 with electrical power. The bendable element 120 may be configured to substantially maintain its shape and position after the bendable element 120 is bent in any of various directions, included twisting. The bendable element 120 may comprise one or more bendable cables or wires within the bendable element 120. The bendable cables or wires may be made from a material with a high degree of ductility and/or malleability, such as aluminum, an aluminum alloy, copper, or a copper alloy. The bendable element 120 may additionally or alternatively comprise one or more power transmission elements, such one or more power wires or cables embedded within the bendable element 120. The power transmission element of the bendable element 120 may transmit electrical power from the power source 106 to the network device 104.

The connection of the bendable element 120 with the power source 206 may physically support the network device 104, at least in part. The bendable element 120 and the power source 206 may be configured with complementary interfaces (e.g. hardware interfaces) via which electrical power is conducted. Such complementary interfaces may physically support the network device 104 when the network device 104 is connected to the power source 106. For instance, the bendable element 120 may be configured with a plug and the power source 106 may be configured with a complementary port. The bendable element 120 may be configured with a USB plug and the power source 106 may be configured with a USB port.

The power source 106 may be realized in any one various of forms. The power source 106 may comprise a computing device, such as a personal computer, a laptop computer, or a rack-mounted computing device. The power source 106 may comprise a set-top box (e.g., a cable television box or digital media player). The power source 106 may comprise a network device, such as a wireless router, wireless access point, cable modem, or DSL modem. The network device 104 may communicate with the network 112 via this same network device to which the bendable element 120 is connected. For example, the bendable element 120 may be plugged into a wireless router to receive power and the network device 104 may communicate with the network 112 via wireless communication with the wireless router. As noted, the computing device, the set-top box, or the other network device may comprise a port into which the bendable element 120 of the network device 104 may be inserted to physically support the network device 104 and provide the network device 104 with power.

The power source 106 additionally or alternatively may comprise a "charger unit." The charger unit may comprise a port configured to receive a plug of the bendable element 120 and a power plug configured to receive power from a power socket, such as an AC power socket. An AC power socket may comprise a wall socket or power strip socket, for example. The power plug of the charger unit may be integrated with the body of the charger unit and/or rigidly affixed to the body of the charger unit. For example, a cube-shaped charger unit may comprise a port on one side of the charger unit and power plug prongs of an opposite side of the charger unit. The charger unit may comprise a USB charger unit, such as a USB wall charger unit.

The second computing device 108 may comprise a server or multiple interconnected servers. The second computing device 108 may be associated with the first computing device 110. The second computing device 108 may receive data (via the network device 104 and the network 112) from the first computing device 110 and perform one or more functions based on the received data. The second computing device 108 may generate a website that presents at least some of the received data and/or information based on the received data. The second computing device 108 may receive multiple sets of data from the first computing device 110 over a period of time and perform data analysis on the aggregated data. The second computing device 108 additionally or alternatively may transmit data (via the network 112 and the network device 104) to the first computing device 110, such as an instruction for the first computing device 110 to perform some action or function. The second computing device 108 may comprise an application server associated with the first computing device 110.

Figure 2:
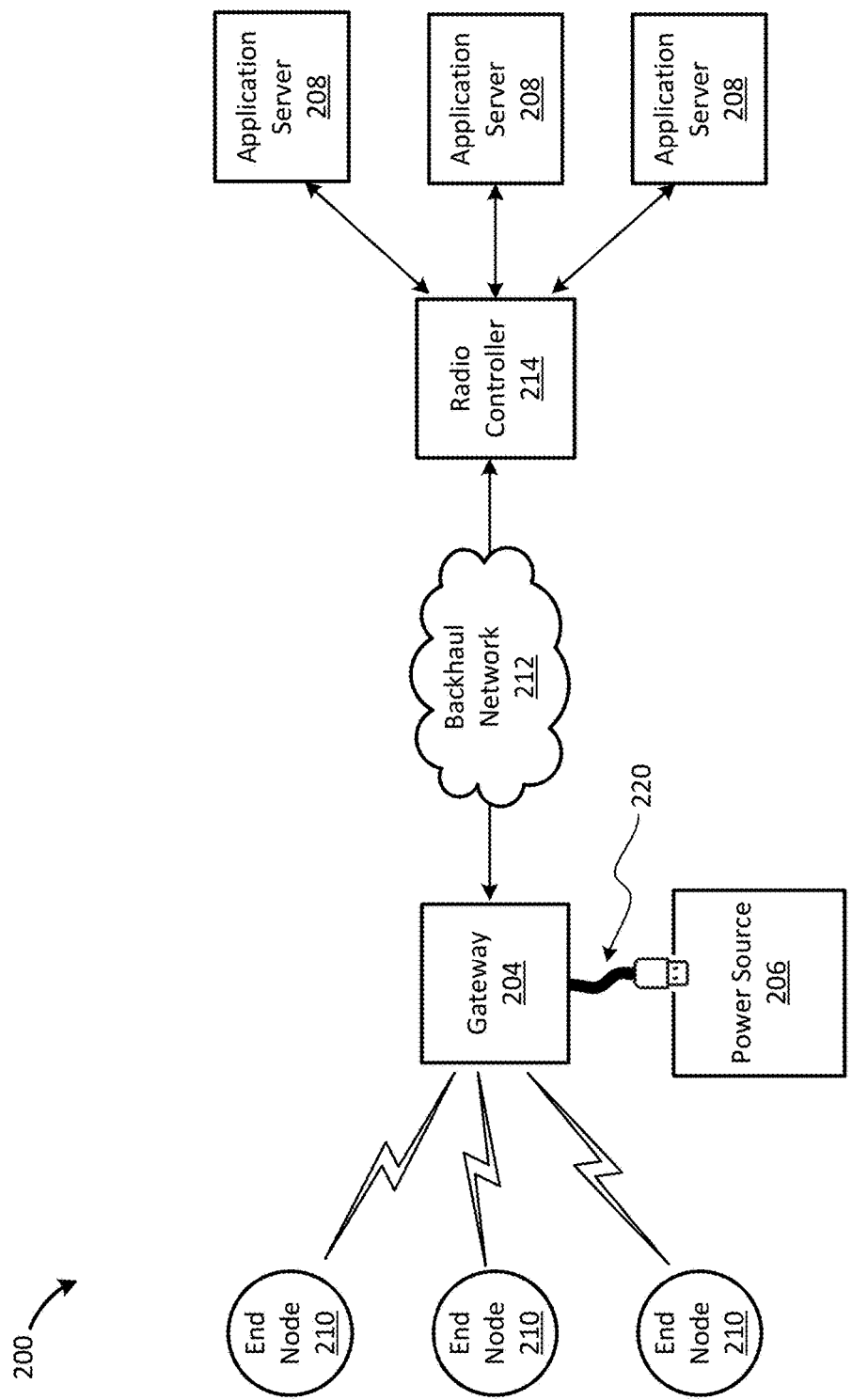
FIG. 2 illustrates a block diagram of a communication system.

FIG. 2 illustrates a system 200 in which the systems, methods, and devices described herein may be implemented. The system 200 may comprise an LPWAN and associated systems and devices. The system 200 may be implemented according to one or more specifications, protocols, and/or standards associated with an LPWAN. For example, the system 200 may be implemented according to the LoRaWAN specification. The system 200 may be the same as or similar to the system 100 of FIG. 1 in some aspects. The system 200 may comprise a gateway 204 configured for wireless communication with one or more end nodes 210. The gateway 204 may comprise a bendable element 220 that may be used to selectively adjust the positioning and orientation of the gateway 204 and its antenna, as well as to supply power to the gateway 204 from a power source 206. The gateway 204 may be configured as a dongle, such as a USB dongle. The gateway 204 may be in mutual communication via a backhaul network 212 with a radio controller 214, which, in turn, is in mutual communication with one or more application servers 208.

An end node 210 may be similar to or the same as the first computing device 110 of FIG. 1 in some aspects. An end node 210 may comprise a low power end node. An end node 210 may be battery-operated. An end node 210 may be realized as a stand-alone device or as embedded electronics. An end node 210 may be configured to collect and store data, such as that measured or determined by a sensor of the end node 210. For example, an end node 210 may comprise a sensor configured to measure air pollution particles. The end node 210 may wirelessly transmit the air pollution data to the gateway 204 for ultimate delivery to an application server 208. Additionally or alternatively, the end node 210 may wirelessly transmit data indicating that the measure of air pollution particles satisfies a threshold (e.g., exceeds a threshold). An end node 210 may comprise an actuator configured to effectuate some action or function, such as based on data (e.g., an instruction) received via the gateway 204. An actuator need not necessarily be a physical actuator, but may be additionally or alternatively a logical actuator or an electronic actuator. An end node 210 may comprise electronics embedded in a coffee maker. This end node 210 may receive data indicating an instruction for the coffee maker to begin to brew coffee.

An end node 210 may wirelessly communicate with the gateway 204 only periodically, such as to minimize power consumption. For example, an end node 210 may activate its communication functionalities only during certain time windows of the day. An end node 210 may be configured to transmit data collected or determined by the end node 210 but not receive data (e.g., payload data). An end node 210 may be configured to receive data but not transmit data (e.g., not transmit collected or determined data, or payload data generally). An end node 210 may be configured to both receive data from the gateway 204 and transmit data to the gateway 204.

The gateway 204 may comprise a network device configured for wireless communication with the end nodes 210. The gateway 204 may be the same as or similar to the network device 104 of FIG. 1 in some aspects. The gateway 204 may comprise an LPWAN gateway. The gateway 204 and the end nodes 210 may be configured for wireless communication using an LPWAN protocol, such as Zigbee, Z-Wave, Wi-Fi HaLow, NB-IoT, DASH7, Sigfox, or LoRa protocols. The gateway 204 may communication with the end nodes 210 using a different protocol (e.g., one or more of the aforementioned LPWAN protocols) than the protocol (or medium altogether) used by the gateway 204 to communicate with the backhaul network 212 (e.g., Wi-Fi, ethernet, or cellular protocols). Communications between the gateway 204 and the end nodes 210 may be in accordance with a low-power scheme. For example, the gateway 204 and the end nodes 210 may communicate with one another only during pre-defined time intervals.

In a similar manner as the network device 104 of FIG. 1, the gateway 204 may be configured with the bendable element 220. The bendable element 220 may be the same as or similar to the bendable element 120 of FIG. 1. The bendable element 220 may be adjusted to put the gateway 204 (e.g., the body of the gateway 204) in a desired position and orientation. The position and orientation of the gateway 204 may give optimal or improved reception for the antenna within the body of the gateway 204. The bendable element 220 may be configured such that a new positioning and/or orientation of the gateway 204 is held after the bendable element 220 is repositioned. The bendable element 220 may be configured with one or more power transmission elements, such as wires or cables, to carry electrical power from the power source 206 to the gateway 204.

The bendable element 220 may be connected to (e.g., plugged into) the power source 206. The connection may provide a mounting point for the gateway 204, as well as provide the gateway 204 with electrical power. For example, bendable element 220 may comprise a plug and the power source 206 may comprise a port configured to receive the plug. The plug and port may comprise a USB plug and USB port, respectively. The power source 206 may be similar to or the same as the power source 106 of FIG. 1 in some aspects. The power source 206 may comprise a computing and/or network device. The power source 206 may comprise a wireless router or gateway, a wireless access point, a cable modem, or a DSL modem. The gateway 204 may communicate with the backhaul network 212 via the power source 206 so configured. The power source 206 may comprise a charger unit. The charger unit may comprise a wall charger unit, such as a USB wall charger unit. The charger unit may comprise a power plug, such as a power plug configured for connection to an AC power socket.

As indicated, the system 200 may comprise the radio controller 214. The radio controller 214 may be configured as an LPWAN radio controller, such as a LoRaWAN radio controller. The radio controller 214 may be embodied as one or more interconnected computing devices, such as servers and/or networking devices. The radio controller 214 may facilitate and coordinate communication between the end nodes 210 and the application servers 208. For example, the interaction between the gateway 204 and the end nodes 210 may be coordinated by the radio controller 214. As such, the radio controller 214 may provide intelligence relating to data packets transmitted between the end nodes 210 and the gateway 204, including, as some examples, scheduling acknowledgments, performing security and data integrity functions, and managing data transmission rates between the end nodes 210 and the gateway 204.

The application servers 208 may be similar to or the same as the second computing device 108 in some aspects. An application server 208 may be associated with one or more end nodes 210 and receive data from an associated end node 210. The application server 208 may perform one or more functions based on the received data. Additionally or alternatively, an application server 208 may transmit data to an associated end node 210, such as instruction for the end node 210 to implement one or more functions.

Figure 3:
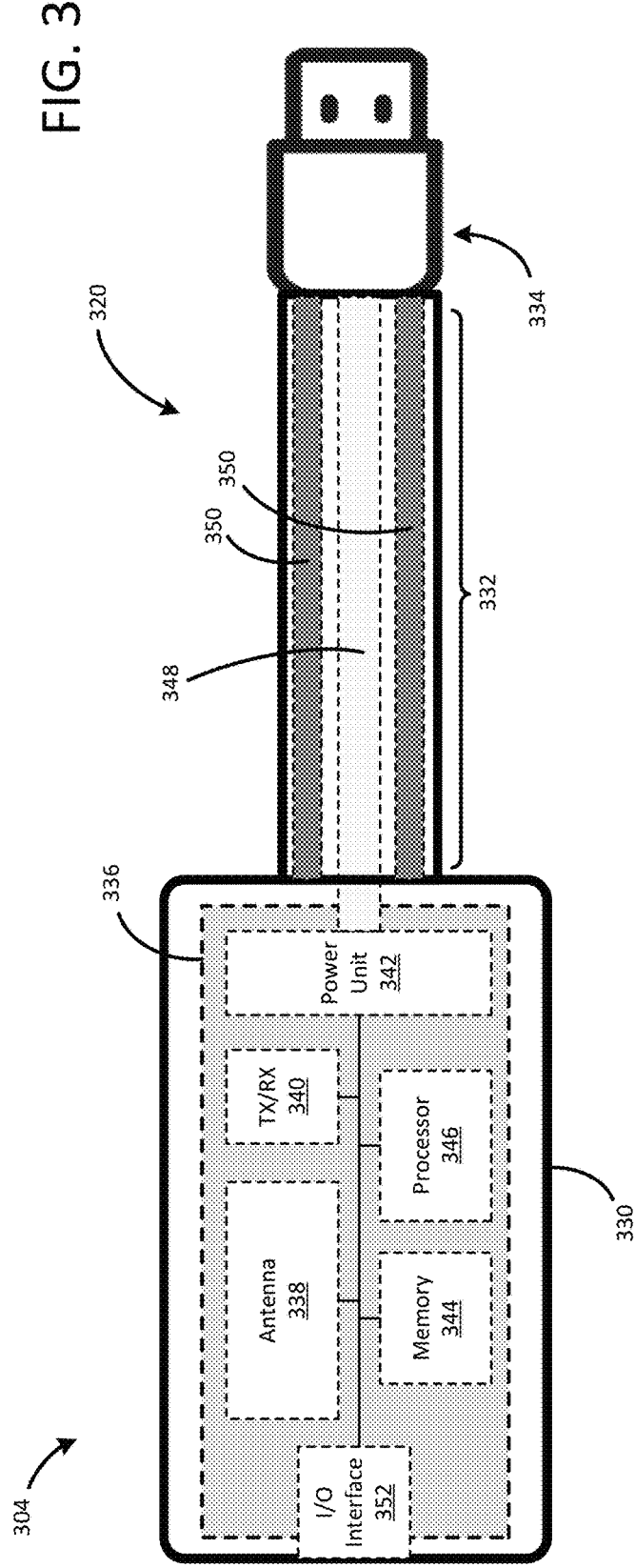
FIG. 3 illustrates a partial cut-away view of a network device.

FIG. 3 illustrates a cutaway view (indicated by the various dotted lines) of a network device 304 (e.g., the network device 104 of FIG. 1 or the gateway 204 of FIG. 2) comprising a body 330 and a bendable element 320 (e.g., the bendable element 120, 220 of FIGS. 1 and 2, respectively). The network device 304 may be configured as a gateway within an LPWAN. The network device 304 may be configured to wirelessly communicate with one or more low power end nodes of the LPWAN. The bendable element 320 may comprise a bendable section 332 and a plug 334. The body 330 may house a printed circuit board (PCB) 336 comprising a plurality of components configured to implement the various functions of the network device 304. For example, the components of the PCB 336 may implement functions of the network device 304 as described in relation to the network device 104 of FIG. 1 and/or the gateway 204 of FIG. 2.

The PCB 336 housed within the body 330 may comprise a processor 346 and memory 344. The processor 346 may effectuate various functions of the network device 304. For example, the processor 346 may implement instructions stored in the memory 344. The memory 344 may additionally or alternatively store data, such as data collected from an LPWAN end node and received by the network device 304. The PCB 336 may comprise a power unit 342 that receives electrical power to operate the network device 304. The power unit 342 may be connected to a power transmission element 348 of the bendable element 320 via which the power unit 342 receives power from a power source (e.g., the power source 106, 206 of FIGS. 1 and 2, respectively).

The PCB 336 may comprise an input/output (I/O) interface 352. The I/O interface 352 may comprise a wired interface, such as an ethernet interface or USB interface. The I/O interface 352 may be used to configure the network device 304 to perform the desired functions. For example, the instructions stored in the memory 344 and executed by the processor 346 may be received via the I/O interface 352.

The PCB 336 may comprise a transceiver (TX/RX) 340 and associated antenna 338 configured to perform wireless communication, such as with one or more end nodes. Such wireless communication may be according to an LPWAN protocol, such as LoRa, Zigbee, Z-Wave, Wi-Fi HaLow, NB-IoT, DASH7, or Sigfox. The transceiver 340 and antenna 338 may communicate using spread spectrum techniques, such as chirp spread spectrum. The antenna 338 may comprise a directional antenna. The antenna 338 may be integrated with the PCB 336. The antenna 338 may comprise a microstrip antenna, such as a patch antenna. The antenna 338 may comprise an inverted-F antenna, such as a planar inverted-F antenna (PIFA). The planar surface of a PIFA (or other antenna) may correspond with (e.g., be parallel with) the planar surface of the PCB 336 to which the various components are mounted or integrated.

As indicated, the network device 304 may comprise a bendable element 320 via which the network device 304 is mounted and receives power. The bendable element 320 may be selectively manipulated (e.g., bent, twisted, etc.) to set the position and/or orientation of the body 330, as well as the facing of the antenna 338 housed therein. The body 330 may be positioned and/or oriented to provide optimal or improved RF transmission and/or reception by the antenna 338. For example, an adjusted position and/or orientation of the body 330 may provide an improved wireless signal for the antenna 338. Improvement to the wireless signal may be with respect to signal strength (as received by the antenna 338) and/or signal noise. An adjusted position and/or orientation of the body 330 may optimize or improve the RF signal spread of the antenna 338. An adjusted position and/or orientation of the body 330 may avoid interference at the antenna 338 caused by other nearby antennas. The position and/or orientation of the body 330 may also be adjusted according to the physical setting in which the network device 304 and an associated power source are installed. For example, the power source may be installed almost flush to an adjacent wall. The body 330 may be positioned and/or oriented so as to fit into the narrow space between the power source and the wall.

The bendable element 320 may comprise a bendable section 332 and a plug 334. As discussed in relation to the plug of the bendable element 120, 220 of FIGS. 1 and 2, respectively, the plug 334 may connect to or be inserted into a port of a power source (e.g., the power source 106, 206 of FIGS. 1 and 2, respectively). The plug 334 may be configured as a USB plug and the port of the power source may be configured as a USB port. The USB plug may be configured according to one or more of the USB 1.x, USB 2.0, USB 3.x, or USB4 specifications. The USB plug may comprise a standard type A plug, a standard type B plug, a standard type C plug, a mini A plug, a mini B plug, a mini AB plug, a micro A plug, a micro B plug, or a micro AB plug. The bendable element 320 may comprise other types of connectors in addition to or as an alternative to the plug 334. For example, the bendable element 320 may comprise a port that connects to a plug of a power source.

The bendable section 332 of the bendable element 320 may comprise one or more malleable elements 350. The one or more malleable elements 350 may be configured with circular, square, or rectangular cross sections. The one or more malleable elements 350 may be in a flat or ribbon configuration. The one or more malleable elements 350 may in the form of a wire. The malleable elements 350 may span at least the majority of the length of the bendable section 332. For example, as shown in FIG. 3, the malleable elements 350 may span the entire length of the bendable section 332. The malleable elements 350 may be formed from aluminum, an aluminum alloy, copper, or a copper alloy. The bendable section 332 may comprise a power transmission element 348 configured to carry electrical power from a power source (via the plug 334) to the power unit 342 in the body 330 of the network device 304. The power transmission element 348 may comprise a wire, a plurality of wires, or a cable, as some examples. The power transmission element 348 may comprise copper wires or cables. Although FIG. 3 depicts two malleable elements, it is understood that the bendable section 332 may comprise one malleable element or it may comprise more than two malleable elements.

The bendable element 320 (e.g., the bendable section 332) may comprise one or more signal-carrying elements (not shown). The one or more signal-carrying elements may effectuate data transmission between one or more components (e.g. the processor 346, the memory 344, or other circuitry) mounted on or integrated with the PCB 336 and a computing device (e.g., a power source) comprising the port or plug with which the plug 334 connects. A port of the computing device or other realization of the power source may comprise a USB port and the plug 334 of the network device 304 may comprise a mating USB plug. Data signals between the computing device and one or more components of the PCB 336 may be carried via the computing device's USB port, the USB plug 334 of the network device 304, and the one or more signal-carrying elements. The one or more signal-carrying elements may be integrated with the power transmission element 348. The one or more signal-carrying elements and the power transmission element 348 may be realized as a single electrical cable, such as a single electrical cable within the bendable section 332.

Figure 4:
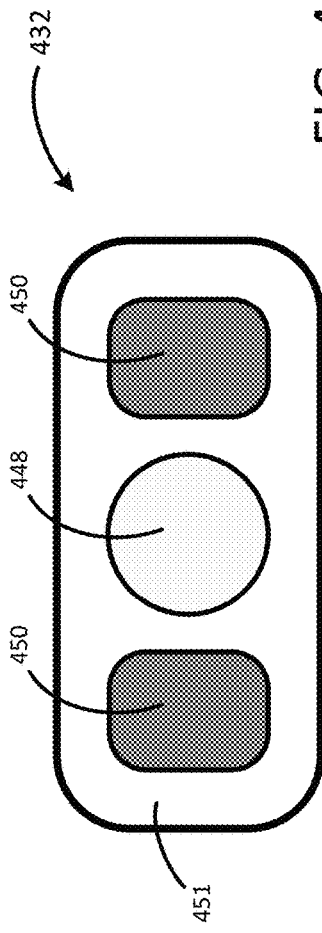
FIG. 4 illustrates a cross-sectional view of a bendable element of a network device.

FIG. 4 illustrates a cross-sectional view of a bendable section 432 (e.g., the bendable section 332 of FIG. 3) of a bendable element of a network device. The bendable section 432 may comprise a central power transmission element 448 flanked on either side by a pair of malleable elements 450. The power transmission element 448 may be configured with a circular cross section. The malleable elements 450 may be configured with rectangular cross sections. The power transmission element 448 and the malleable elements 450 may be similar to or the same as the respective power transmission element 348 and malleable elements 350 of FIG. 3 in some aspects. The power transmission element 448 and the malleable elements 450 may be encased within an insulating covering material 451, such as a flexible plastic. Although FIG. 4 depicts two malleable elements 450, it is understood that the bendable section 432 may comprise one malleable element or it may comprise more than two malleable elements.

Figure 5:
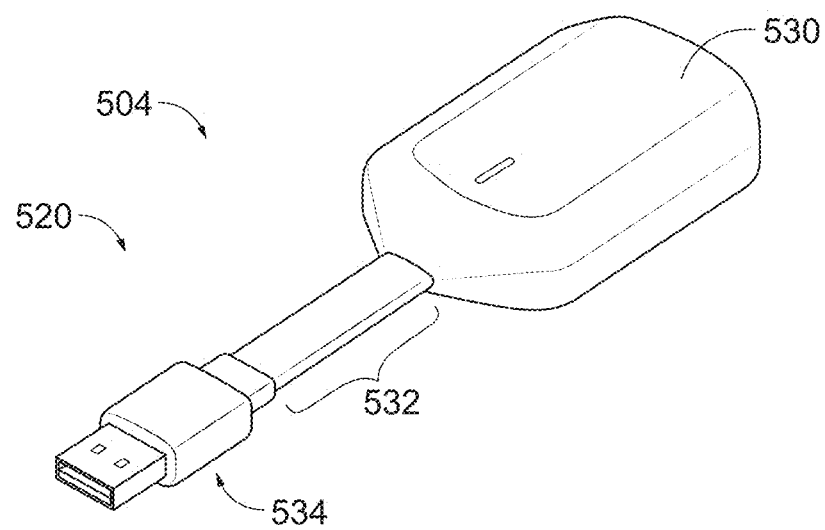
FIG. 5 illustrates a perspective view of a network device.

FIG. 5 illustrates a perspective view of a network device 504 (e.g., the network device 304 of FIG. 3). The network device 504 may comprise a gateway, such as an LPWAN gateway. The network device 504 may comprise a body 530 housing a PCB. The PCB may comprise a transceiver and associated antenna for wireless communication, such as wireless communication with one or more end nodes. The network device 504 may comprise a bendable element 520 having a bendable section 532 and a plug 534. The plug 534 may be connected to a power source to provide electrical power for the network device 504. The connection of the plug 534 to the power source may additionally or alternatively provide a mounting point to support the body 530. The bendable section 532 may be manipulated (e.g., bent, twisted, etc.) to adjust the position and/or orientation of the body 530 and the antenna within. The bendable section 532 is depicted in a flat or ribbon shape, but the disclosure is not so limited. For example, the bendable section 532 may be configured to have a circular, square, or rectangular cross section.

Figure 6:
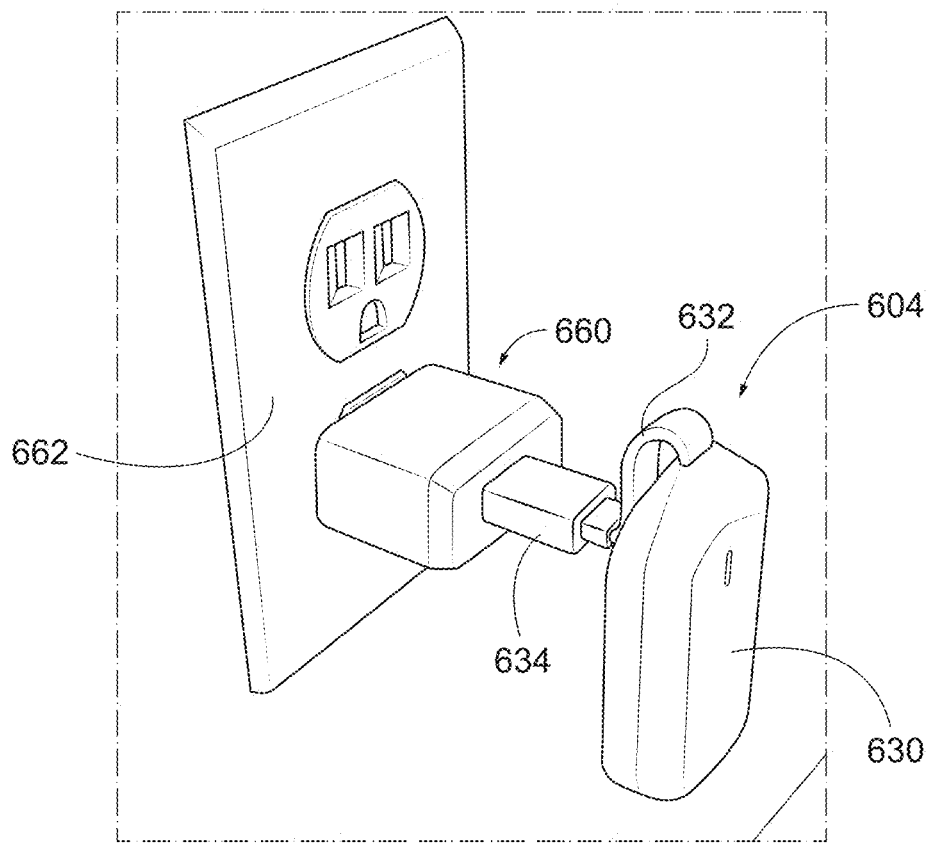
FIG. 6 illustrates a perspective view of a network device.

FIG. 6 illustrates a perspective view of a network device 604 (e.g., the network device 304 of FIG. 3) connected to a charger unit 660. The charger unit 660, in turn, may be connected to a wall socket 662 to receive power. The network device 604 may comprise an LPWAN gateway. The network device 604 may comprise a body 630. The body 630 may house a PCB (e.g., the PCB 336 of FIG. 3) comprising a transceiver and antenna. The network device 604 may comprise a bendable element having a bendable section 632 and a plug 634. The plug 634 may be inserted into the charger unit 660 to carry electrical power to the body 630 of the network device 604 (e.g., the power unit and other components on the PCB) via the bendable section 632. The charger unit 660 may act as the power source (e.g., the power source 106, 206 of FIGS. 1 and 2, respectively) in this example. In the network device 604 shown in FIG. 6, the plug 634 may comprise a USB plug and the charger unit 660 may comprise a USB wall charger unit configured with a USB port. The charger unit 660 may comprise two or three prongs (not visible in FIG. 6) inserted into the wall socket 662.

As shown in FIG. 6, the bendable section 632 is bent (e.g., according to operator manipulation) in such a manner to cause the body 630 to assume an orientation that is perpendicular to the orientation of the plug 634 and the port of the charger unit 660. That is, the body 630 is perpendicular to the direction in which the plug 634 is inserted into the port of the charger unit 660. The configuration of the bendable section 632 has also caused the body 630 to be positioned closer to the charger unit 660 and wall socket 662 than if the bendable section 632 were straightened.

FIGS. 7A-7E illustrate configurations of a network device 704 (e.g., the network device 304 of FIG. 3) and its bendable section 732. By virtue of the properties of the bendable section 732 described herein, the network device 704 may substantially maintain the illustrated position after a manipulating force is removed. In the various views shown in FIGS. 7A-7E, the plug 734 is assumed to be in a fixed position, such as may be the case when connected to a power source. Although the orientation of the plug 734 is shown in FIGS. 7A-7E as being horizontal, such as if the connected-to port is on a side surface of the power source, the disclosure is not so limited. For example, the plug 734 may connect to a port on a top surface or an angled surface of the power source.

Figure 7A:
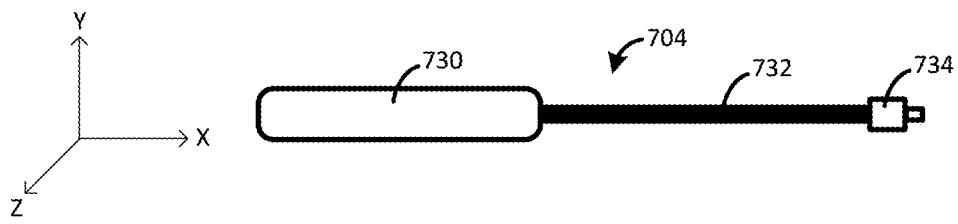
FIGS. 7A-7D illustrate side views of network device positionings.
Figure 7B:
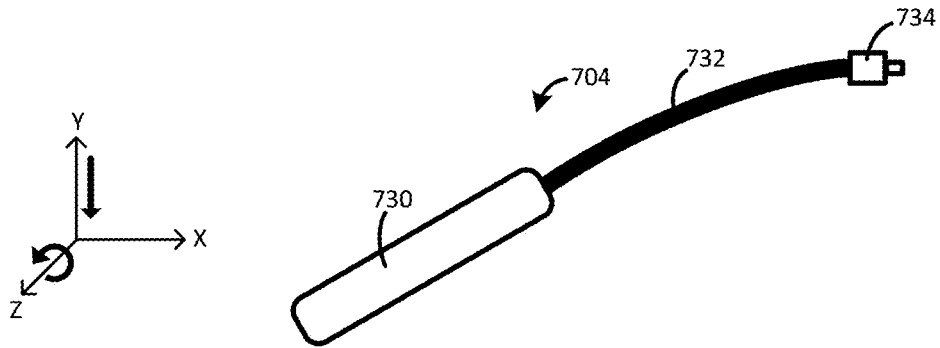
Figure 7C:
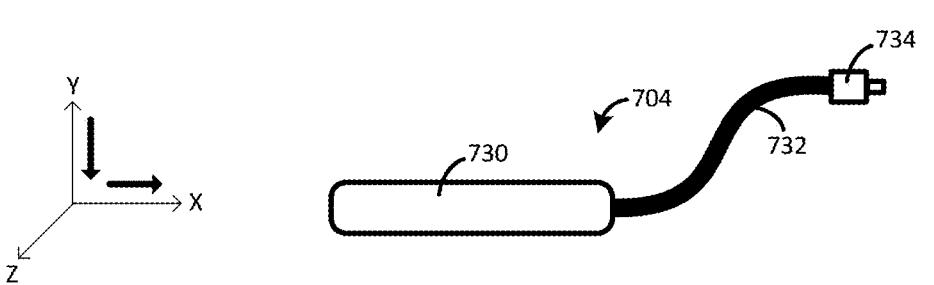
Figure 7D:
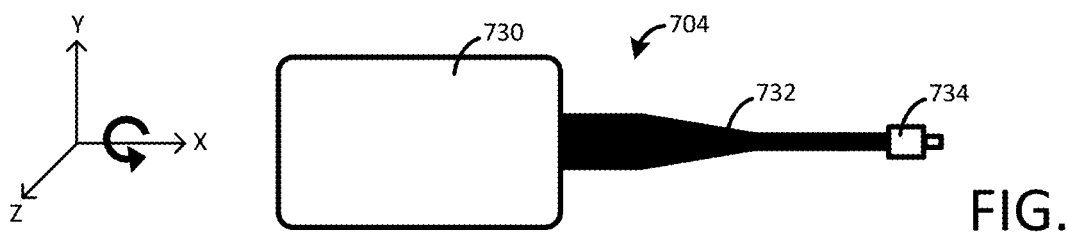
Figure 7E:
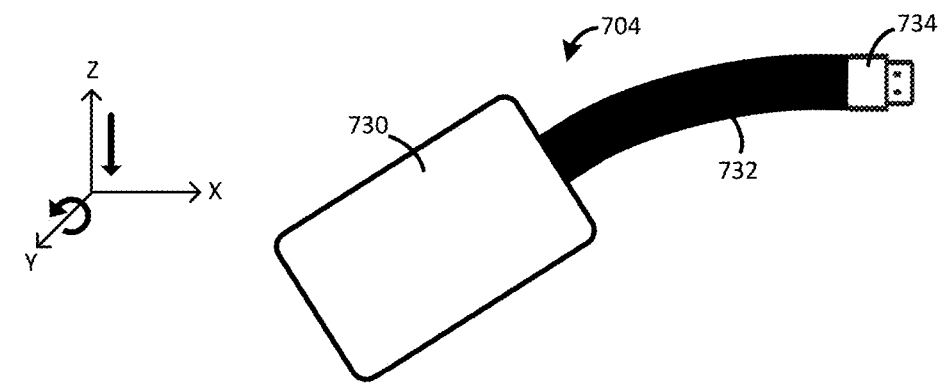
FIG. 7E illustrates a top-down view of a network device positioning.

FIGS. 7A-7D show the network device 704 from a side view and FIG. 7E shows the network device 704 from a top view, as indicated by the respective set of three-dimensional (X, Y, Z) coordinate lines accompanying each figure. If considered with respect to the dimensions of the body 730, the X-axis corresponds to the length-wise dimension of the body 730, the Y-axis corresponds to the height-wise dimension of the body 730, and the Z-axis corresponds to the width-wise dimension of the body 730.

In FIG. 7A, the bendable section 732 is positioned in a straightened configuration. For purposes of the discussion of FIGS. 7B-7E, the position of the body 730 may be considered neutral with respect to the X-, Y-, and Z-axes. For example, the positions of the body 730 and bendable section 732 in FIG. 7A may be considered as initial positions and the positions of the body 730 and bendable section in FIGS. 7A-7E may be considered adjusted positions.

In FIG. 7B, the bendable section 732 is configured to bend downward, causing the body 730 to rotate outward from the plug 734 and shift downward from the plug 734. That is, the body 730 is rotated counter-clockwise about the Z-axis and moved downward on the Y-axis. The rotation of the body 730 in FIG. 7B may be also seen as an adjustment to the orientation of the body 730 with respect to the width-wise axis of the body. The positioning shown in FIG. 7B would also cause a minor shift toward the plug 734 on the X-axis.

In FIG. 7C, the bendable section 732 is configured in an S-like shape, causing the body 730 to move toward the plug 734 (i.e., backward) on the X-axis and downward from the plug 734 on the Y-axis. Relative to the positioning shown in FIG. 7A, no rotation of the body 730 is exhibited in FIG. 7C.

In FIG. 7D, the bendable section 732 is subject to a twisting manipulation. In particular, the bendable section 732 is twisted length-wise by 90 degrees relative to the positioning shown in FIG. 7A, causing a like rotation of the body 730. That is, the body 730 is rotated about the X-axis. The rotation of the body 730 in FIG. 7D may be also seen as an adjustment to the orientation of the body 730 with respect to the length-wise axis of the body.

In FIG. 7E (a top-down view of the network device 704), the bendable section 732 is configured to bend sideward, causing a sideward shift and rotation (i.e., a height-wise rotation) of the body 730. That is, the body 730 is shifted along the Z-axis and rotated about the Y-axis. The rotation of the body 730 in FIG. 7E may be also seen as an adjustment to the orientation of the body 730 with respect to the height-wise axis of the body. The positioning shown in FIG. 7E would also cause a minor shift of the body 730 toward the plug 734 on the X-axis.

The configurations and positionings of the bendable section 732 and body 730 shown in FIG. 7A-7E are only examples of the many possible configurations and positionings. The body 730 may be positioned according to any combination of an upward/downward shift (e.g., a shift along the Y-axis), a forward/backward shift (e.g., a shift along the X-axis), a side-to-side shift (e.g., a shift along the Z-axis), a length-wise rotation (e.g., a rotation about the X-axis), a height-wise rotation (e.g., a rotation about the Y-axis), and a width-wise rotation (e.g., a rotation about the Z-axis). For example, the body 730 may be both shifted and rotated. For example, the body 730 may be rotated around both a first axis and a second axis of the body 730 (and even a third axis of the body 730). For example, the body 730 may be shifted both upward and side-to-side (and even toward or away from the plug 734).

By virtue of these many possible configurations of the bendable section 732, the antenna within the body 730 may be faced in virtually any direction. This may enable optimal or improved RF reception and/or transmission for the antenna (e.g., RF signal spread). Further, the various possible configurations of the bendable section 732 may allow the network device 704 to accommodate for any space restrictions or challenges caused by the placement of the power source port to which the plug 734 connects, the placement generally of the power source, or the placement of any other equipment in the vicinity of the power source.

Figure 8:
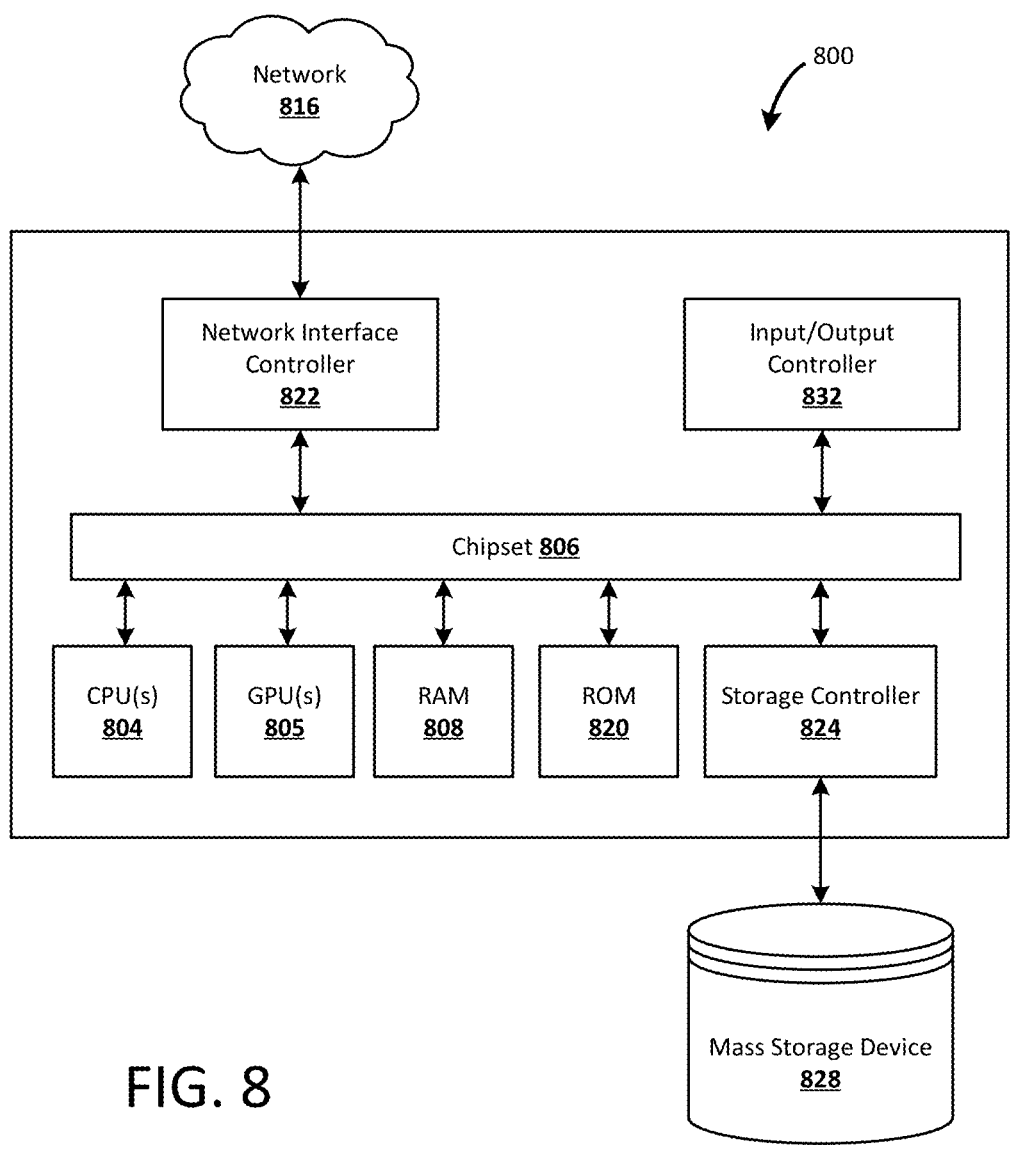
FIG. 8 illustrates a block diagram of a computing device.

FIG. 8 depicts a computing device in which the systems, methods, and devices disclosed herein, or all or some aspects thereof, may be embodied. For example, components such as the first computing device 110, network device 104, power source 106, and second computing device 108 of FIG. 1, the end nodes 210, gateway 204, power source 206, radio controller 214, and application servers of FIG. 2, the network device 304 of FIG. 3, the network device 504 of FIG. 5, the network device 604 of FIG. 6, and the network device 704 of FIGS. 7A-7E may be implemented generally in a computing device, such as the computing device 800 of FIG. 8. The computing device of FIG. 8 may be all or part of a server, workstation, desktop computer, laptop, tablet, network appliance, PDA, e-reader, digital cellular phone, set top box, or the like, and may be utilized to implement any of the aspects of the systems, methods, and devices described herein.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the systems, methods, and devices are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described systems, methods, and devices. When combinations, subsets, interactions, groups, etc., of these components are described, it is understood that while specific references to each of the various individual and collective combinations and permutations of these may not be explicitly described, each is specifically contemplated and described herein, for all systems, methods, and devices. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the systems, methods, and devices may take the form of an entirely hardware embodiment, an entirely software embodiment, or an embodiment combining software and hardware aspects. Furthermore, the systems, methods, and devices may take the form of a computer program product on a computer-readable storage medium having computer-readable program instructions (e.g., computer software) embodied in the storage medium. More particularly, the present systems, methods, and devices may take the form of web-implemented computer software. Any suitable computer-readable storage medium may be utilized including hard disks, CD-ROMs, optical storage devices, or magnetic storage devices.

Embodiments of the systems, methods, and devices are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the systems, methods, and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A network device comprising:
    a body comprising an antenna configured to enable radio frequency (RF) communication; and
    a bendable element attached to the body and configured to carry electrical power to the body, wherein the bendable element is further configured for variable positioning, a positioning of the bendable element is substantially maintained upon removal of a positioning force, and a facing of the antenna is based on the positioning of the bendable element.

2. The network device of claim 1, wherein performance of the antenna in at least one of RF reception or RF transmission is based on the facing of the antenna.

3. The network device of claim 1, wherein the bendable element comprises a plug at an end of the bendable element distal from an attachment point of the bendable element to the body, wherein the plug is configured to receive electrical power from a power source.

4. The network device of claim 3, wherein the plug is configured to connect to a port of the power source and the connection of the plug to the port physically supports, at least in part, the network device.

5. The network device of claim 4, wherein the power source comprises a charger unit.

6. The network device of claim 4, wherein the power source comprises at least one of a wireless router, a wireless gateway, a wireless access point, a cable modem, a digital subscriber line (DSL) modem, or a set-top box.

7. The network device of claim 3, wherein the plug comprises a universal serial bus (USB) plug.

8. The network device of claim 1, wherein:
    the bendable element is configured to adjust a position of the body in at least one of a direction corresponding to a length-wise dimension of the body, a direction corresponding to a width-wise dimension of the body, or a direction corresponding to a height-wise dimension of the body, and
    the bendable element is configured to adjust an orientation of the body with respect to at least one of a length-wise axis of the body, a height-wise axis of the body, or a width-wise axis of the body.

9. The network device of claim 1, wherein:
    the bendable element is configured to adjust a position of the body in at least two of a direction corresponding to a length-wise dimension of the body, a direction corresponding to a width-wise dimension of the body, or a direction corresponding to a height-wise dimension of the body, and
    the bendable element is configured to adjust an orientation of the body with respect to at least two of a length-wise axis of the body, a height-wise axis of the body, or a width-wise axis of the body.

10. The network device of claim 1, wherein:
    the bendable element is configured to adjust a position of the body in each of a direction corresponding to a length-wise dimension of the body, a direction corresponding to a width-wise dimension of the body, and a direction corresponding to a height-wise dimension of the body, and
    the bendable element is configured to adjust an orientation of the body with respect to each of a length-wise axis of the body, a height-wise axis of the body, and a width-wise axis of the body.

11. The network device of claim 1, wherein the network device is configured as a gateway for a low power wire area network (LPWAN).

12. The network device of claim 11, wherein the network device is configured to communicate, via the antenna, with one or more end nodes of the LPWAN.

13. The network device of claim 12, wherein the network device is configured to communicate with the one or more end nodes via a protocol comprising at least one of Zigbee, Z-Wave, Wi-Fi HaLow, NB-IoT, DASH7, Sigfox, or LoRa.

14. The network device of claim 1, wherein the bendable element comprises a malleable element via which a positioning of the bendable element is substantially maintained and a power transmission element via which the electrical power is carried to the body.

15. A network device comprising:
    a body;

a printed circuit board (PCB) housed within the body and comprising an antenna configured to enable radio frequency (RF) communication; and a bendable element comprising an elongate bendable section and a plug configured to receive electrical power, wherein a proximate end of the bendable section is attached to and physically supports the body and a distal end of the bendable section is configured with the plug, wherein the bendable section comprises a power transmission element electrically connecting the plug with a power unit associated with the PCB and at least one malleable element via which a variable positioning of the bendable section is substantially maintained upon removal of a positioning force.

16. The network device of claim 15, wherein the plug comprises a universal serial bus (USB) plug.

17. The network device of claim 15, wherein the antenna comprises at least one of a microstrip antenna, a patch antenna, an inverted-F antenna, or a planar inverted-F antenna (PIFA).

18. The network device of claim 17, wherein a planar surface of the antenna corresponds with a planar surface of the PCB.

19. The network device of claim 15, wherein the at least one malleable element spans at least a majority of a length of the bendable section.

20. The network device of claim 15, wherein the at least one malleable element comprises at least one of aluminum, an aluminum alloy, copper, or a copper alloy.

* * * * *